(12) United States Patent
Challender et al.

(10) Patent No.: US 7,661,723 B2
(45) Date of Patent: *Feb. 16, 2010

(54) FLUID LINE ASSEMBLY

(75) Inventors: Gary B. Challender, Jackson, MI (US); Philip R. Morrison, Mason, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/363,081

(22) Filed: Jan. 30, 2009

(65) Prior Publication Data

US 2009/0134621 A1    May 28, 2009

Related U.S. Application Data

(63) Continuation of application No. 11/203,764, filed on Aug. 15, 2005, now Pat. No. 7,503,590.

(51) Int. Cl.
*F16L 27/04* (2006.01)

(52) U.S. Cl. .................... 285/261; 285/302

(58) Field of Classification Search .......... 285/224, 285/227, 261, 263, 299, 298, 302, 123.13–123.17, 285/262; 137/15.1
See application file for complete search history.

(56) References Cited

U.S. PATENT DOCUMENTS

| | | | | |
|---|---|---|---|---|
| 2,813,731 A | * | 11/1957 | Tracy et al. | 285/262 |
| 2,824,758 A | * | 2/1958 | Cattrell | 285/187 |
| 2,921,803 A | * | 1/1960 | Tracy et al. | 285/262 |
| 3,427,051 A | | 2/1969 | White et al. | |
| 4,445,332 A | | 5/1984 | Thies et al. | |
| 4,967,795 A | | 11/1990 | Cardin et al. | |
| 5,011,194 A | | 4/1991 | Nitta | |
| 6,056,329 A | | 5/2000 | Kitani et al. | |
| 6,237,965 B1 | | 5/2001 | Kuo | |
| 6,250,690 B1 | | 6/2001 | Sakai | |
| 6,257,625 B1 | | 7/2001 | Kitani et al. | |
| 6,854,486 B2 | | 2/2005 | Challender | |
| 6,871,882 B2 | | 3/2005 | Challender et al. | |
| 7,284,771 B2 | | 10/2007 | Baumann et al. | |

* cited by examiner

*Primary Examiner*—Aaron M Dunwoody
(74) *Attorney, Agent, or Firm*—Benesch, Friedlander, Coplan & Aronoff LLP

(57) ABSTRACT

A fluid line assembly (20) includes an outer fluid line (24) and an inner fluid line (22). The inner and outer fluid lines (22, 24) each include a slip joint (70, 80). At least one of the slip joints (70, 80) include a variable volume reservoir (86) in communication with the interior of the corresponding fluid line (22, 24). The reservoir (86) is at least partially defined by a first tube section (82), a second tube section (84) having an axially extending portion and radially extending portion, and a radially extending piston (90) connected to the first tube section (82) for movement therewith. The at least one slip joint (70, 80) also includes a resiliently compressible conductive member (98) positioned between and in contact with the piston (90) and the radially extending portion of the second tube section (84) to create an electrical path therebetween. The resiliently compressible conductive member (98) is divided into sections (98a-x), wherein each section (98a-x) is separated from an adjacent section (98a-x) by a spacer member (100) adapted to inhibit contact between the axially extending portion of the second tube section (84) and the resiliently compressible conductive member (98).

20 Claims, 4 Drawing Sheets

US 7,661,723 B2

FLUID LINE ASSEMBLY

CROSS REFERENCE TO RELATED APPLICATIONS

This application is a continuation of U.S. application Ser. No. 11/203,764 filed on Aug. 15, 2005, now U.S. Pat. No. 7,503,590 issued Mar. 17, 2009, the disclosure of which is incorporated by reference herein in its entirety.

BACKGROUND OF THE INVENTION

1. Field of the Invention

The present invention relates generally to a fluid line assembly and to a ball-and-socket fluid line assembly.

2. Description of the Related Art

Many industrial, automotive and aerospace applications require the transfer of fluid between two components. For example, in certain aircraft it is common to transfer fuel between two spaced apart fuel tanks or between a fuel pump and a fuel tank. Flexible hoses and rigid pipes have typically been used to convey fluid from one component to another. While flexible hoses can be easily routed and also tolerate movement and vibration better than rigid pipes, flexible hoses are generally more expensive and incapable of conveying fluid at the pressures a rigid pipe of comparable diameter can convey. Flexible hoses also exhibit a minimum bend radius and are generally not capable of more than a minimal amount of twist once installed. Moreover, both flexible hoses and rigid pipes may leak, which is intolerable in certain applications. For these and other reasons, it is desirable to provide an improved means for conveying fluid between two components.

SUMMARY OF THE INVENTION

A fluid line assembly is provided that includes an outer fluid line and an inner fluid line. The inner and outer fluid lines each include a slip joint. In an embodiment, at least one of the slip joints includes a variable volume reservoir in communication with the interior of the corresponding fluid line. The reservoir is at least partially defined by a first tube section, a second tube section having an axially extending portion and radially extending portion, and a radially extending piston connected to the first tube section for movement therewith. The at least one slip joint also includes a resiliently compressible conductive member positioned between and in contact with the piston and the radially extending portion of the second tube section to create an electrical path therebetween. The resiliently compressible conductive member is divided into sections, wherein each section is separated from an adjacent section by a spacer member adapted to inhibit contact between the axially extending portion of the second tube section and the resiliently compressible conductive member. Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION

Figure 1:
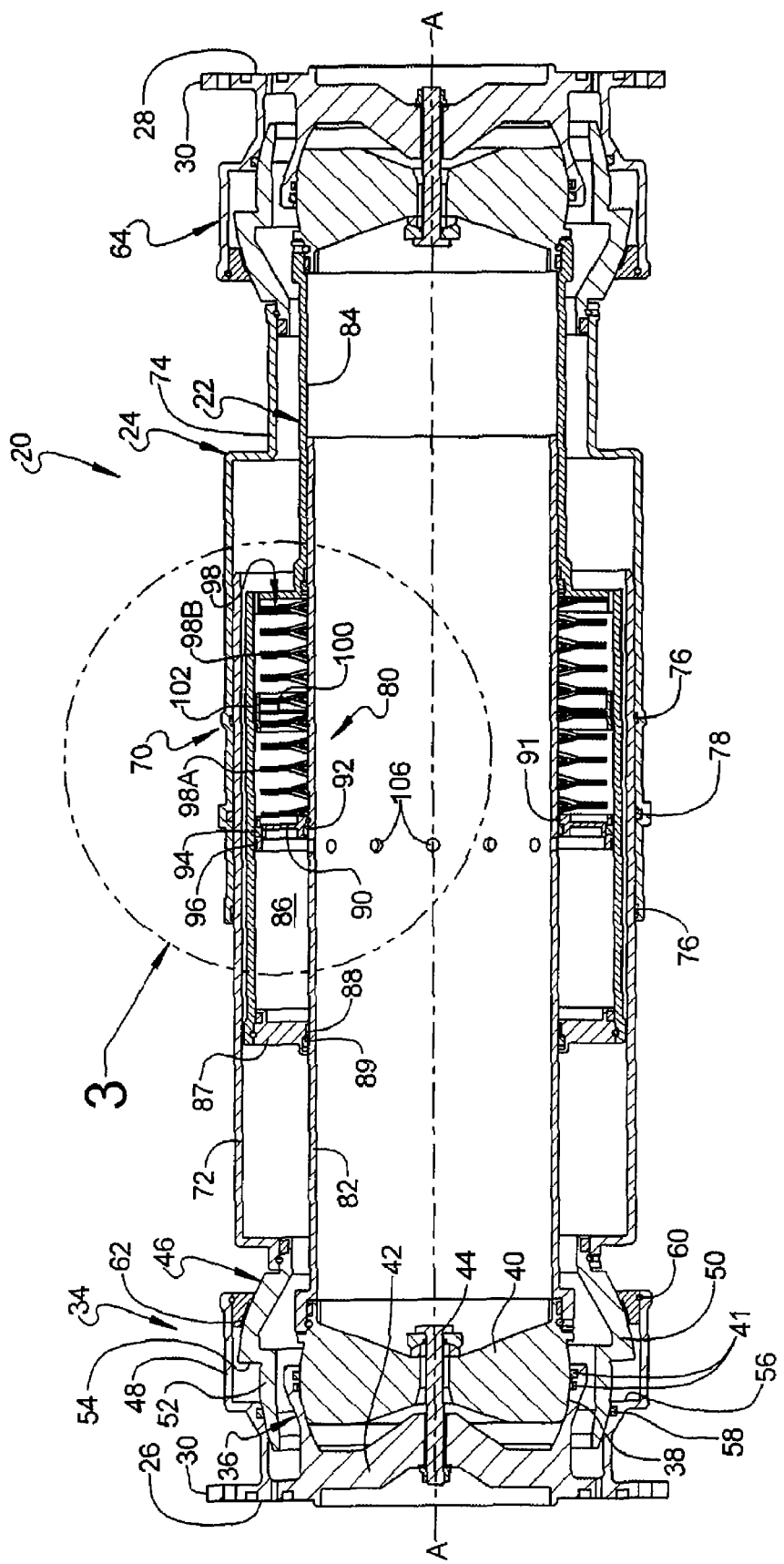
FIG. 1 is a cross-sectional view of a fluid line assembly according to an embodiment of the present invention.
Figure 2:
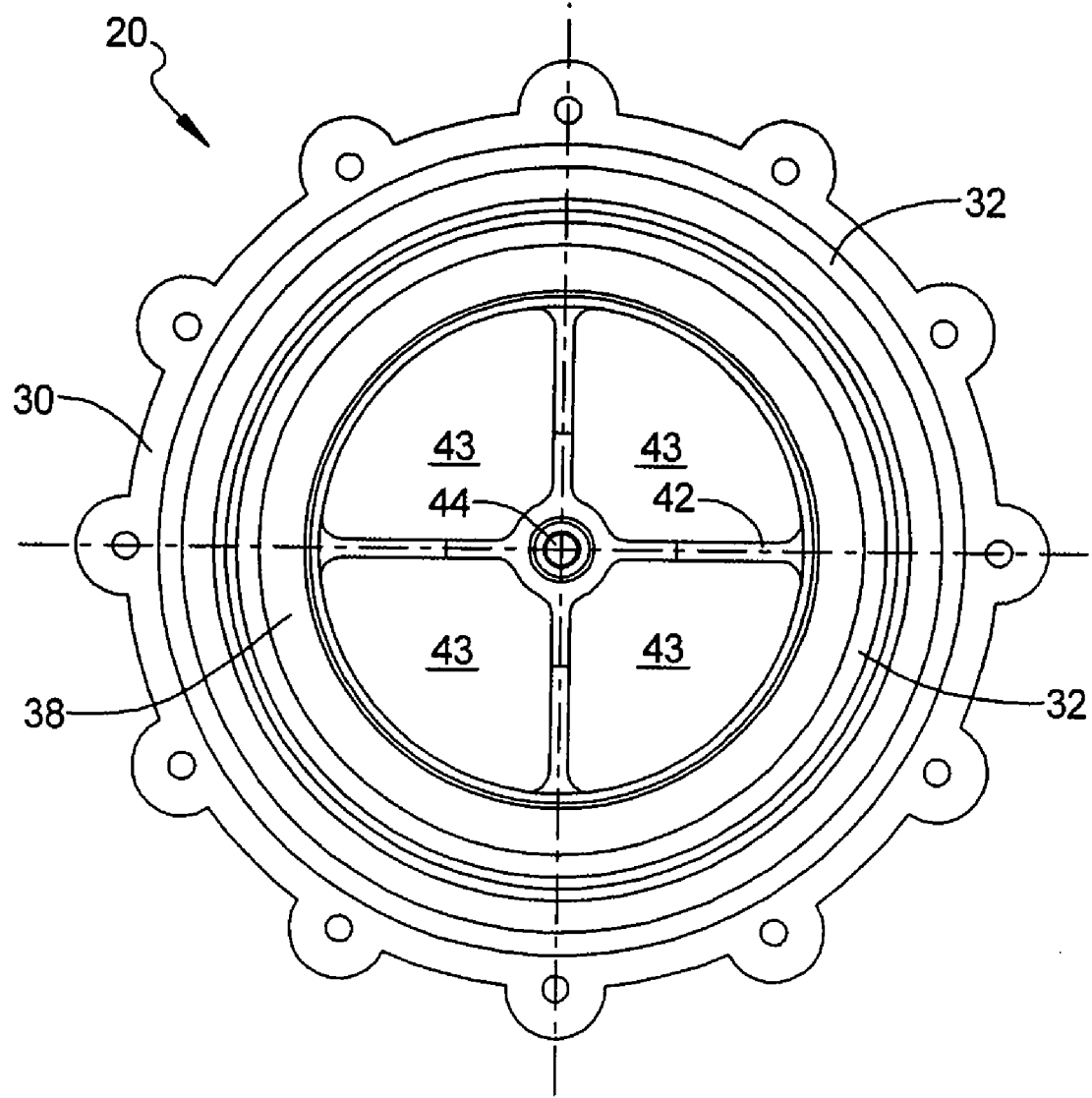
FIG. 2 is an end view of the fluid line assembly shown in FIG. 1.
Figure 3:
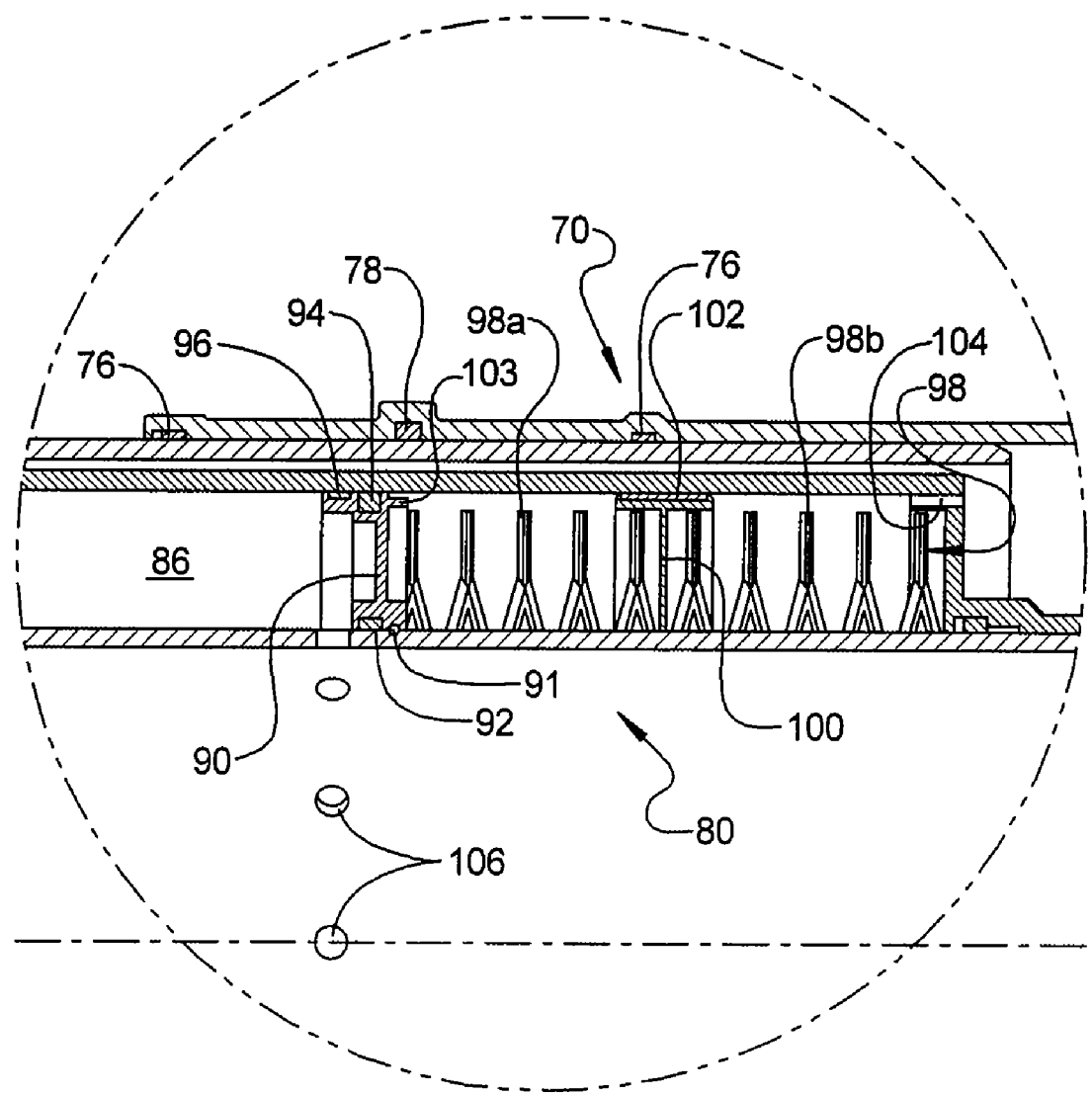
FIG. 3 is an enlarged detailed view of the fluid line assembly shown in FIG. 1.

Referring now to the drawings, several embodiments of the present invention are shown in detail. The drawings are not necessarily to scale and certain features may be exaggerated to better illustrate and explain the present invention. Further, the embodiments set forth herein are not intended to be exhaustive or otherwise limit or restrict the invention to the precise configurations shown in the drawings and disclosed in the following detailed description.

A ball-and-socket fluid line assembly 20 according to an embodiment of the present invention is shown in FIG. 1. Fluid line assembly 20 includes an inner fluid line 22 and an outer fluid line 24. Inner fluid line 22 functions as the primary fluid containment member, whereas outer fluid line 24 functions as a secondary fluid containment member to prevent fluid leakage into the surrounding environment should inner fluid line 22 fail or leak. Inner and outer fluid lines 22, 24 may be made from an electrically conductive material, such as aluminum or steel.

Fluid line assembly 20 extends from a first end 26 to a second end 28. Each end 26, 28 includes a means for attaching fluid line assembly 20 to another structure, such as a fuel tank. In an embodiment, each end 26, 28 includes a flange 30 having at least one groove 32 sized for receipt of an o-ring or other sealing member (not shown). Each flange 30 is configured to be secured to the mating structure, such as by bolting or welding flange 30 to the mating structure. It will be appreciated that the means used to secure fluid line assembly 20 to mating structures is not limited to flanges 30, and that other suitable means known in the art for securing fluid line assembly 20 to mating structures, such as a threaded connection, are within the scope of this invention.

Fluid line assembly 20 is generally characterized as a double ball-joint design, allowing a portion of fluid line assembly 20 to pivot and rotate relative to another portion of fluid line assembly 20. In an embodiment of the invention, fluid line assembly 20 includes a double ball-joint assembly 34 proximate first end 26. A first or inner ball-joint 36 includes a socket portion 38 and a webbed ball portion 40 sealingly nested within socket portion 38 using a sealing member arrangement 41, including, for example, a polymeric wiper seal and packing. Socket portion 38 is connected to flange 30 and includes a webbed portion 42 that defines a number of passages 43 for fluid flow. A fastener 44, such as a bolt and nut combination, connects socket portion 38 to webbed ball portion 40. This configuration permits inner ball-joint 28 to be articulated under pressure with little or no resistance.

A second or outer ball-joint 46 includes a socket portion 48 and a ball portion 50. Socket portion 48 is connected to flange 30. Ball portion 50 includes a generally rounded or bulbous surface 52 and a shoulder 54 that extends outward from bulbous surface 52. Shoulder 54 is spaced apart axially from a corresponding shoulder 56 in socket portion 48. Ball portion 50 is rotatable in socket portion 48 until shoulder 54 on ball portion 50 contacts shoulder 56. An annular sealing member 58, such as an o-ring, is provided within a groove in socket portion 48 for sealing engagement with bulbous surface 52 of ball portion 50. A locking ring 60, or other suitable connecting means, is used to retain a bearing member 62 within socket member 48. Bearing member 62 facilitates rotation of ball portion 50 within socket portion 48 and inhibits removal of ball portion 50 from socket portion 48 after assembly. In the illustrated embodiment, second end 28 of fluid line assembly 20 is provided with a double ball-joint assembly 64 that is substantially similar in structure and function to double ball-joint assembly 34 and, therefore, will not be further described.

In an embodiment of the invention, outer fluid line 24 includes a slip joint 70. As illustrated in FIG. 1, slip joint 70 includes a first outer tube section 72 sealingly connected to ball-joint assembly 34 and a second outer tube section 74 sealingly connected to ball-joint assembly 64. At least one bearing member 76 and a sealing member 78 are positioned between first and second outer tube sections 72, 74 to facilitate movement and inhibit fluid leakage, respectively, therebetween.

Inner fluid line 22 also includes an inner slip joint 80. As illustrated in FIG. 1, inner slip joint 80 includes a first inner tube section 82 sealingly connected to ball-joint assembly 34 and a second inner tube section 84 sealingly connected to ball-joint assembly 64. An axially extending portion of second inner tube section 82 is spaced apart from first inner tube section 84 to define a void 86 therebetween. A retainer 87 is sealingly connected to second inner tube section 84 for movement therewith, and includes a bearing member 88 and a sealing member 89 positioned between first inner tube section 82 and retainer 87 to facilitate movement and inhibit fluid passage, respectively, therebetween.

A piston 90 is connected to second inner tube section 84 for movement therewith by a retaining ring 91. Piston includes a pair of sealing members 92 and 94, such as o-rings, that sealingly engage first inner tube sections 82 and 84, respectively, and a bearing member 96 that facilitates relative movement between second inner tube section 84 and piston 90. A resiliently compressible member 98, such as a compression or wave spring, extends axially between and contacts piston 90 and second inner tube section 84. In an embodiment, resiliently compressible member 98 is made of an electrically conductive material, which permits an electrical charge to be transferred between first inner tube section 82 (via piston 90) and a radially extending portion of second inner tube section 84.

Figure 4:
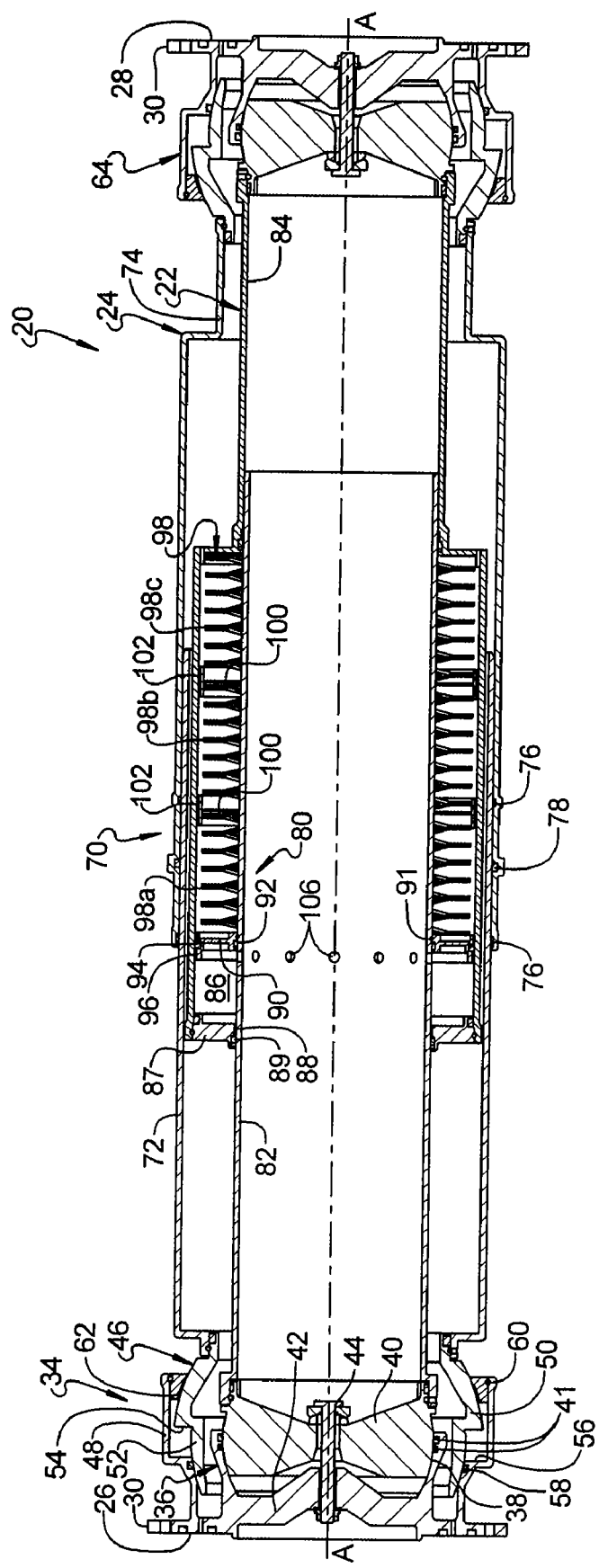
FIG. 4 is a cross-sectional view of a fluid line assembly according to another embodiment of the present invention.

In an embodiment, resiliently compressible member 98 is divided into a number of sections 98a-x, wherein each section is separated from an adjacent section by an electrically conductive spacer member 100. In the embodiment shown in FIG. 1, for example, resiliently compressible member 98 is divided into two sections 98a and 98b with a spacer member 100 separating the two sections. In the embodiment shown in FIG. 4, for example, resiliently compressible member 98 is divided into three sections 98a, 98b and 98c with spacer members 100 separating middle section 98b from the two adjacent sections 98a and 98c.

In an embodiment, each spacer member 100 includes a bearing member 102 to facilitate relative movement between spacer member 100 and second inner tube section 84. Spacer members 100 are generally T-shaped with an axially extending portion of the "T" having an inner diameter greater than the outer diameter of resiliently compressible member sections 98a-x. Similarly, each of piston 90 and second inner tube section 84 may include a flange portion 103 and 104, respectively, having an inner surface that is smaller in diameter than second inner tube section 84, but greater in diameter than resiliently compressible member sections 98a-x. Spacer member 100 and flange portions 103, 104 function to prevent resiliently compressible member sections 98a-x from impacting the axially extending portion of second inner tube section 84 adjacent resiliently compressible member sections 98a-x during vibration of fluid line assembly 20.

First outer tube section 72 and second outer tube section 74 are moveable relative to each other along an axis A-A in FIG. 1. Similarly, first inner tube section 82 and second inner tube section are moveable relative to each other along axis A-A. Thus, inner and outer slip joints 70, 80 permit fluid line assembly 20 to be axially extended and contracted, as required. As piston 90 moves within void 86, resiliently compressible member 98 is compressed and expanded while maintaining contact with piston 90 and the radially extending portion of second inner tube section 84. These and other features facilitate installation of fluid line assembly 20 between two components and allow for movement of the mating components without adversely affecting the sealing performance or electrical conductivity of the fluid line assembly.

In an embodiment, the portion of void 86 between retainer 87 and piston 90 functions as a reservoir for excess fluid contained in inner fluid line 22 when fluid line assembly 20 is contracted. At least one passage 106 extends through first inner tube section 82 to allow fluid to enter the reservoir (void) 86. Allowing an incompressible fluid, such as fuel, to flow into the expanding reservoir dissipates the shock or stress on inner fluid line 22 as it is contracted. Similarly, during extension of fluid line assembly 20, fluid contained in the reservoir is free to flow back into inner fluid line 22 through holes 106 as the reservoir volume decreases. Inner slip joint 80 is also pressure balanced. As will be appreciated, an increase in fluid pressure within inner fluid line 22 and the reservoir may act to expand the volume of the reservoir creating a contracting force in fluid line assembly 20. Expansion forces within the reservoir, and the corresponding contracting forces created in fluid line assembly 20, act to resist expansion of inner fluid line 22 due to the increase in fluid pressure.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A fluid line assembly, comprising:
   an outer fluid line having a slip joint;
   an inner fluid line having a slip joint, wherein at least one of the slip joints of the inner fluid line and the outer fluid line has a reservoir in communication with an interior of the corresponding fluid line, the reservoir at least partially defined by a first tube section, a second tube section having an axially extending portion and radially extending portion;
   a radially extending piston connected to the first tube section for movement therewith; and
   a resiliently compressible member positioned between and in contact with the piston and the radially extending portion of the second tube section, the resiliently compressible member is divided into sections, wherein each section is separated from an adjacent section by a spacer member.

2. The fluid line assembly of claim 1, wherein the outer fluid line includes at least a pair of outer ball-joint assemblies, including a first outer ball-joint assembly and a second outer ball-joint assembly.

3. The fluid line assembly of claim 1, wherein the inner fluid line includes at least a pair of inner ball-joint assemblies, including a first inner ball-joint assembly and a second inner ball-joint assembly.

4. The fluid line assembly of claim 3, wherein the first and second inner ball-joint assemblies each include a webbed ball portion moveably secured to a socket portion.

5. The fluid line assembly of claim 1, wherein a bearing member is position between the second tube section and the spacer member.

6. The fluid line assembly of claim 1, wherein the spacer member is generally T-shaped, including a radially extending portion and an axially extending portion.

7. The fluid line assembly of claim 6, wherein the axially extending portion is greater in diameter than the resiliently compressible member.

8. The fluid line assembly of claim 1, wherein each of the piston and the second tube section include a flange portion having an inner surface that is smaller in diameter than radially extending portion of the second inner tube section, but greater in diameter than resiliently compressible member.

9. The fluid line assembly of claim 1, wherein the resiliently compressible member is one of a compression spring and a wave spring.

10. A fluid line assembly, comprising:
 an outer fluid line having a slip joint and at least two outer ball-joint assemblies, including a first outer ball-joint assembly and a second outer ball-joint assembly;
 an inner fluid line having a slip joint and at least two inner ball-joint assemblies, including a first inner ball-joint assembly and a second inner ball-joint assembly, and further including a socket portion and a webbed ball portion moveably connected to the socket portion; and
 wherein the inner and outer fluid lines each have a slip joint, at least one of the slip joints including a reservoir.

11. The fluid line assembly of claim 10, wherein the reservoir is at least partially defined by a piston connected to the first tube section for movement therewith, the at least one slip joint also including a resiliently compressible conductive member positioned between and in contact with the piston and the second tube section to create an electrical path therebetween.

12. The fluid line assembly of claim 11, wherein the resiliently compressible conductive member is one of a compression spring and a wave spring.

13. The fluid line assembly of claim 11, wherein the reservoir is further defined by a first and second tube section, the second tube section having a radially extending portion and an axially extending portion.

14. The fluid line assembly of claim 13, further comprising a generally T-shaped spacer member, including a radially extending portion and an axially extending portion.

15. The fluid line assembly of claim 14, wherein a bearing member is position between the second tube section and the spacer member to facilitate relative movement therebetween.

16. The fluid line assembly of claim 13, wherein each of the piston and the second tube section include a flange portion having an inner surface that is smaller in diameter than the radially extending portion of the second tube section, but greater in diameter than the resiliently compressible conductive member.

17. A fluid line assembly, comprising:
 an outer fluid line having at least a pair of outer ball-joint assemblies, including a first outer ball-joint assembly and a second outer ball-joint assembly;
 an inner fluid line having at least a pair of inner ball-joint assemblies, including a first inner ball-joint assembly and a second inner ball-joint assembly having a socket portion and a webbed ball portion moveably connected to the socket portion by a fastener; and
 wherein the inner and outer fluid lines each include a slip joint, at least one of the slip joints including a variable volume reservoir in communication with the interior of the corresponding fluid line, the reservoir at least partially defined by a first tube section, a second tube section having an axially extending portion and radially extending portion, and a radially extending piston connected to the first tube section for movement therewith, the at least one slip joint also including a resiliently compressible member positioned between and in contact with the piston and the radially extending portion of the second tube section.

18. The fluid line assembly of claim 17, wherein the spacer member is generally T-shaped, including a radially extending portion and an axially extending portion, the axially extending portion being greater in diameter than the resiliently compressible member.

19. The fluid line assembly of claim 17, wherein each of the piston and the second tube section include a flange portion having an inner surface that is smaller in diameter than radially extending portion of the second inner tube section, but greater in diameter than resiliently compressible member.

20. The fluid line assembly of claim 17, wherein the resiliently compressible member is one of a compression spring and a wave spring.

\* \* \* \* \*